(12) United States Patent
Nigam et al.

(10) Patent No.: US 10,003,566 B2
(45) Date of Patent: Jun. 19, 2018

(54) METHOD AND APPARATUS FOR ASSIGNING A LOGICAL ADDRESS IN A COMMUNICATION SYSTEM

(71) Applicant: Samsung Electronics Co., Ltd., Suwon-si, Gyeonggi-do (KR)

(72) Inventors: Anshuman Nigam, Bangalore (IN); Anil Agiwal, Bangalore (IN); Young-Bin Chang, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 259 days.

(21) Appl. No.: 14/357,407

(22) PCT Filed: Nov. 9, 2012

(86) PCT No.: PCT/KR2012/009492
§ 371 (c)(1),
(2) Date: May 9, 2014

(87) PCT Pub. No.: WO2013/070034
PCT Pub. Date: May 16, 2013

(65) Prior Publication Data
US 2014/0317314 A1    Oct. 23, 2014

(30) Foreign Application Priority Data
Nov. 9, 2011 (IN) ............................ 3849/CHE/2011

(51) Int. Cl.
*G06F 15/16* (2006.01)
*H04L 29/12* (2006.01)
*H04W 8/26* (2009.01)
*H04W 84/18* (2009.01)

(52) U.S. Cl.
CPC .............. *H04L 61/20* (2013.01); *H04W 8/26* (2013.01); *H04W 84/18* (2013.01)

(58) Field of Classification Search
CPC ................................. H04L 61/20; H04W 8/26
USPC ........................................................ 709/245
See application file for complete search history.

(56) References Cited

U.S. PATENT DOCUMENTS

| | | | |
|---|---|---|---|
| 6,219,715 B1 * | 4/2001 | Ohno ................ | H04L 29/12216 370/401 |
| 6,980,801 B1 * | 12/2005 | Soininen ............... | H04W 8/065 370/228 |
| 8,005,056 B2 * | 8/2011 | Park .................. | H04L 29/12283 370/324 |
| 8,204,503 B1 * | 6/2012 | Wick ................ | H04W 36/0016 455/436 |

(Continued)

FOREIGN PATENT DOCUMENTS

WO    2010/072250 A1    7/2010

*Primary Examiner* — Nicholas Taylor
*Assistant Examiner* — Meng Vang
(74) *Attorney, Agent, or Firm* — Jefferson IP Law, LLP

(57) ABSTRACT

A method and a system for assigning a unique logical address to a mobile station in a cloud cell are provided. The method includes selecting, by the master base station, a unique logical address from an associated set of addresses, wherein the set of addresses is a subset of a common address space, and assigning the unique logical address to the mobile station so that the mobile station and each of the plurality of base stations communicate in the cloud cell using the assigned unique logical address.

20 Claims, 15 Drawing Sheets

(56) References Cited

U.S. PATENT DOCUMENTS

| | | | |
|---|---|---|---|
| 2002/0118656 A1* | 8/2002 | Agrawal | H04L 12/24 370/329 |
| 2003/0058818 A1* | 3/2003 | Wilkes | H04W 36/0055 370/331 |
| 2007/0060134 A1 | 3/2007 | Bhatti et al. | |
| 2007/0060143 A1* | 3/2007 | Bhatti | H04L 29/12009 455/445 |
| 2007/0104148 A1* | 5/2007 | Kang | H04W 4/08 370/331 |
| 2007/0173259 A1* | 7/2007 | Akihara | H04W 24/02 455/446 |
| 2008/0037478 A1* | 2/2008 | Na | H04L 29/12311 370/338 |
| 2009/0135793 A1* | 5/2009 | Nandagopal | H04L 29/12311 370/338 |
| 2011/0142017 A1 | 6/2011 | Coldren | |
| 2011/0261737 A1 | 10/2011 | Desai et al. | |

* cited by examiner

| ADDRESS SET 1 | BS 104A, BS 104B, BS 104E |
| --- | --- |
| ADDRESS SET 2 | BS 104C, BS 104G, BS 104H |
| ADDRESS SET 3 | BS 104D, BS 104J |
| ADDRESS SET 4 | BS 104I, BS 104F |

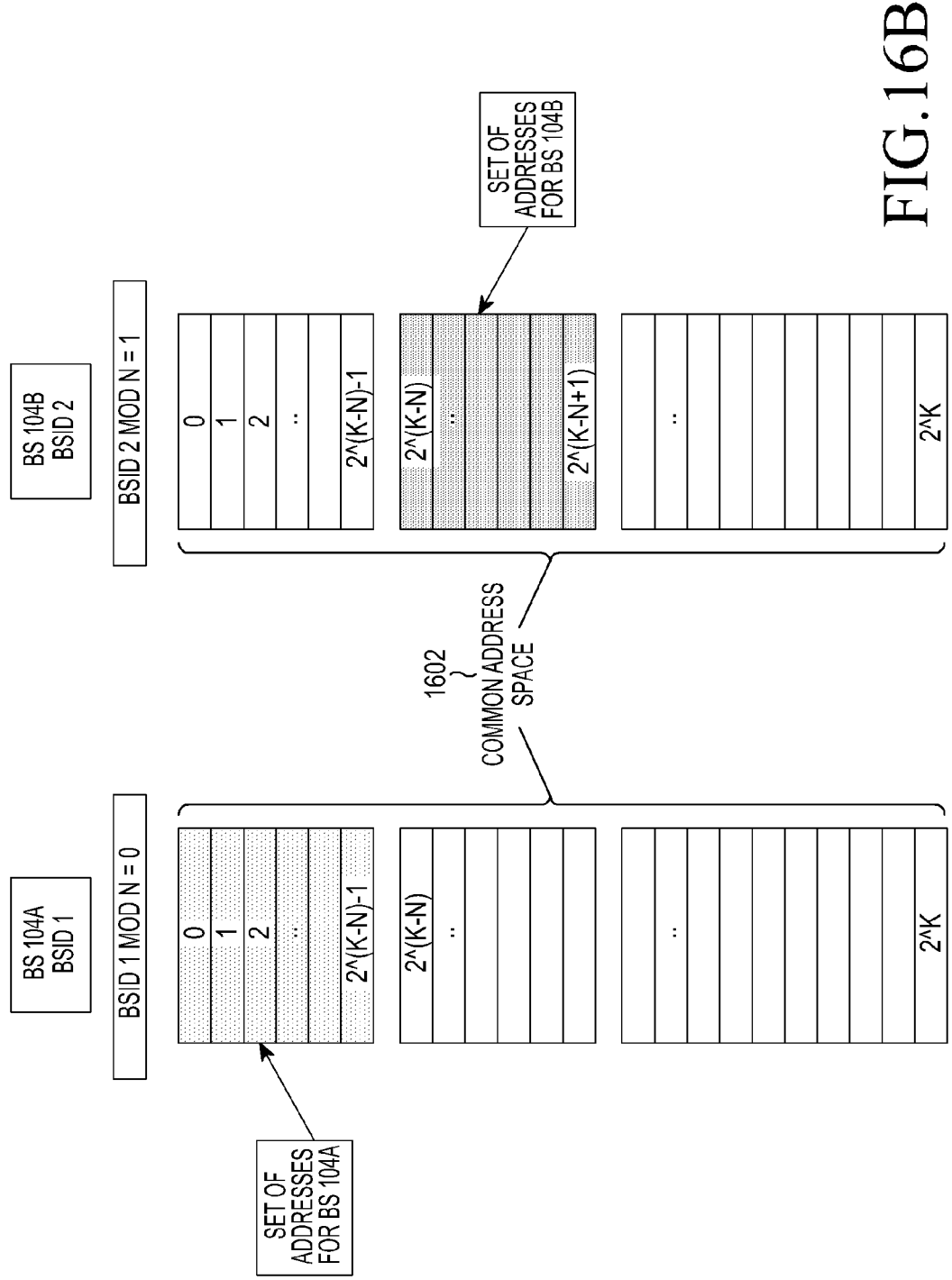

METHOD AND APPARATUS FOR ASSIGNING A LOGICAL ADDRESS IN A COMMUNICATION SYSTEM

CROSS-REFERENCE TO RELATED APPLICATION(S)

This application is a U.S. National Stage application under 35 U.S.C. § 371 of an International application filed on Nov. 9, 2012 and assigned application number PCT/KR2012/009492, which claims the benefit of an Indian patent application filed on Nov. 9, 2011 in the Indian Intellectual Property Office and assigned Serial number 3849/CHE/2011, the entire disclosure of which is hereby incorporated by reference.

TECHNICAL FIELD

The present disclosure relates to a mobile broadband system with multiple base stations serving a single mobile station. More particularly, the present disclosure relates to a method and a system for assigning a logical address to a mobile station in a cloud cell using a disjoint address space.

BACKGROUND

A Millimeter-Wave Mobile Broadband (MMB) system is a millimeter wave based system which operates in a radio frequency range of 30 Gigahertz (GHZ) and 300 GHz. An MMB system uses radio waves with wavelength in range of 1 millimeter (mm) to 10 mm and is a candidate for next generation mobile communication technology due to considerable amount of spectrum available in mmWave band.

Generally, in an MMB system, MMB base stations are deployed with higher density than macro-cellular base stations in order to ensure good network coverage. This is possible as transmission and reception of signals is based on narrow beams which suppress interference from neighboring MMB base stations and extend the range of an MMB link.

Typically, in an MMB network, multiple base stations form a grid with a large number of nodes with which a mobile station can communicate, thereby ensuring high quality Equal Grade Of Service (EGOS) irrespective of the location of the mobile station. The grid having a plurality of base stations serving a mobile station is commonly termed as a virtual cell or a cloud cell. In a could cell, the multiple base stations communicating with a mobile station need to perform downlink transmission beamforming while the mobile station communicating with the base stations need to perform downlink reception beamforming for receiving downlink control information and data packets. Similarly, a mobile station communicating with a base station in a cloud cell may need to perform uplink transmission beamforming while the base station needs to perform uplink reception beamforming for transmitting uplink data.

Further, in a cloud cell, one of base stations acts as a master base station and remaining base stations act as slave base stations with respect to the mobile station. The base stations in the cloud cell serving a mobile station keeps changing dynamically based on movement of the mobile station. The cloud cell thus is a user centric virtual cell. In an overlapping cloud cell scenario, a base station can be a part of more than one cloud cell. In one cloud cell, the base station acts as a master base station for one mobile station and in another cloud cell, the base station act as a slave base station for another mobile station or the base station can act as a master base station for another mobile station.

Generally, in a cellular system of the related art, a mobile station communicates with a single base station and is assigned a unique logical address by the base station. The logical address assigned by the base station distinguishes one mobile station from another mobile station in the domain of the base station that has assigned the logical address. Typically, the logical address assigned to the mobile station is used by the base station for signaling resource allocation information to each mobile station. The logical address in the resource allocation signaling enables the mobile station to determine whether the resource allocation signaling received from the base station is intended for itself or some other mobile station. In addition, the logical address is used by the mobile station in bandwidth request signaling transmitted to the base station. The logical address in the bandwidth request enables the base station to uniquely identify the mobile station from whom the bandwidth request is received. Accordingly, the base station can allocate resources to the mobile station associated with the logical address. Moreover, the logical address assigned to the mobile station is also used to scramble physical layer protocol data units.

In a cloud cell environment, a mobile station communicates with multiple base stations and receives data and control information from multiple base stations. In order to communicate with multiple base stations, each of the base station assigns an individual logical address that is unique across the mobile stations in its domain. The mobile station needs to maintain multiple logical addresses and has to use the logical address specific to the base station with which it communicates. The mobile station can receive/transmit data and control packets from one or more base stations dynamically as directed by the master base station in the cloud cell. This leads to increased complexity at the mobile station as the mobile station has to keep determining the base stations from which it has to communicate and then configure the logical address for transmit/receive processing for determined base stations.

The Medium Access Control (MAC) layer in the mobile station also needs to be aware of the base station with which the mobile station is communicating in order to prepare the control message (e.g., a bandwidth request) and data packets (Security algorithms uses logical address to protect data packets) carrying the appropriate logical address. This would lead to delayed building of data packets and control packets by the MAC layer in the mobile station. In a high speed network, this delayed building of data packets is not desirable for fast processing.

Therefore, a need exists for a method and a system for assigning a logical address to a mobile station in a cloud cell using a disjoint address space.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus for assigning a logical address in a cloud cell.

Another aspect of the present disclosure is to provide a method and an apparatus for assigning disjoint sets of addresses to a plurality of base stations in a communication system.

In accordance with an aspect of the present disclosure, a method for assigning a logical address to a mobile station in a cloud cell, wherein the cloud cell comprises a plurality of base stations, each of the plurality of base stations comprising a master base station and one or more slave base stations is provided. The method includes selecting, by the master base station, a unique logical address from an associated set of addresses, wherein the set of addresses is a subset of a common address space, and assigning the unique logical address to the mobile station so that the mobile station and each of the plurality of base stations communicate in the cloud cell using the assigned unique logical address.

In accordance with another aspect of the present disclosure, a base station for assigning a logical address to a mobile station in a cloud cell is provided. The base station includes a communication interface configured to communicate with other base stations, a transceiver configured to communicate with the mobile station, and a controller configured to select a unique logical address from an associated set of addresses, wherein the set of addresses is a subset of a common address space, and to assign the unique logical address to the mobile station so that the mobile station and each of a plurality of base stations communicate in the cloud cell using the assigned unique logical address.

In accordance with another aspect of the present disclosure, a method for allocating disjoint sets of addresses to a plurality of base stations in a geographical area is provided. The method includes determining a number of base stations located adjacent to each other in a geographical area, determining an identifier associated with each of the base stations in the geographical area, deriving disjoint sets of addresses from a common address space based on the identifier of each base station and the number of base stations, and allocating the disjoint set of addresses to each of the base stations so that each of the base stations uniquely assigns a single unicast logical address to a mobile station in a respective cloud cell using the associated disjoint set of addresses.

In accordance with another aspect of the present disclosure, a network entity for allocating disjoint sets of addresses to a plurality of base stations in a geographical area is provided. The network entity includes a communication interface configured to communicate with a base station, and a controller configured to determine a number of base stations located adjacent to each other in a geographical area, to determine an identifier associated with each of the base stations in the geographical area, to derive disjoint sets of addresses from a common address space based on the identifier of each base station and the number of base stations, and to allocate the disjoint set of addresses to each of the base stations so that each of the base stations uniquely assigns a single unicast logical address to a mobile station in a respective cloud cell using the associated disjoint set of addresses.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 16B is a schematic representation illustrating an allocation of a set of addresses to geographically adjacent base stations according to an embodiment of the present disclosure.

The same reference numerals are used to represent the same elements throughout the drawings.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Figure 1:
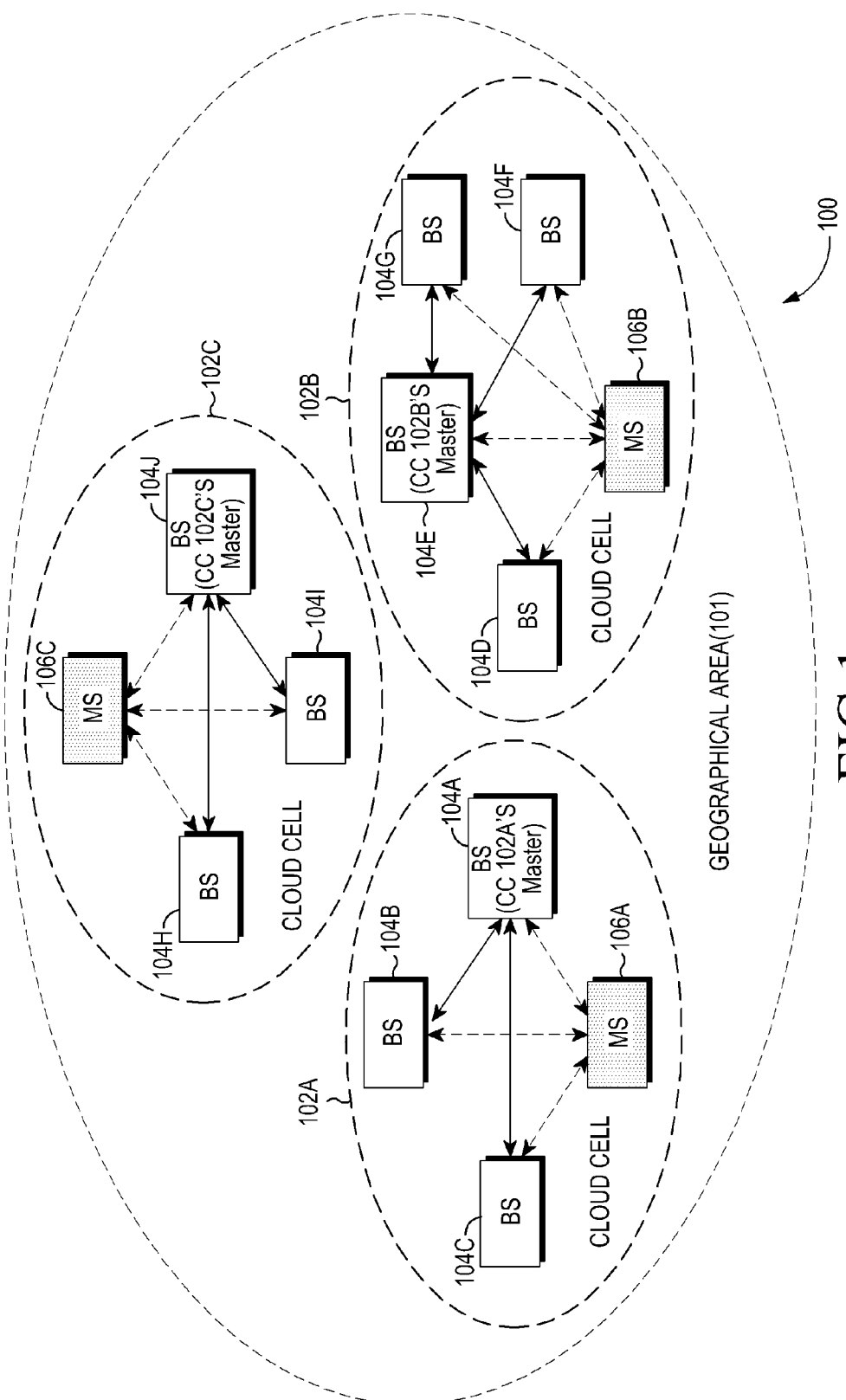
FIG. 1 is a schematic diagram illustrating a cloud cell environment according to an embodiment of the present disclosure.

FIG. 1 is a schematic diagram illustrating a cloud cell environment according to an embodiment of the present disclosure.

Referring to FIG. 1, a cloud cell environment 100 includes a plurality of cloud cells 102A-C constituting of base stations 104A-J located adjacent to each other in a geographical area 101. Each cloud cell is a user centric virtual cell consisting of a plurality of base stations serving a mobile station. A cloud cell serving a mobile station may have same base stations as in another cloud cell serving another mobile station. In addition, a cloud cell serving a mobile station may have some base stations same as base stations in another cloud cell serving another mobile station. On the other hand, a cloud cell serving a mobile station may have all distinct base stations from base stations in another cloud cell serving another mobile station.

For the purpose of illustration, three cloud cells viz. the cloud cell 102A, the cloud cell 102B and the cloud cell 102C are depicted in FIG. 1. The cloud cell 102A includes multiple Base Stations (BSs) 104A to 104C serving a Mobile Station (MS) 106A. In the cloud cell 102A, the BS 104A is assigned a role of a master and remaining BSs 104B and 104C act as a slave BS. Similarly, the cloud cell 102B includes multiple BSs 104D to 104G serving a mobile station 106B. In the cloud cell 102B, the BS 104E is a master BS while the remaining BSs 104D, 104F and 104G act as slave BSs. Similarly, the cloud cell 102C includes multiple BSs 104H to 104J serving a mobile station 106C. In the cloud cell 102C, the BS 104J is a master BS while the remaining BSs 104H and 104I act as slave BSs.

In each of the cloud cells 102A-C, a master BS can directly communicate data packets with a data gateway (not shown) while a slave BS communicates with the data gateway via the master BS. The data gateway may be directly connected to an Internet Protocol (IP) network (not shown) or connected via other network nodes.

It can be noted that a cloud cell consisting of two or more BSs is formed when a mobile station enters a wireless network. BSs in a cloud cell as well as a master BS keep changing based on the movement of the mobile station. When a BS joins or exits the cloud cell, the cloud cell is to be updated.

According to an embodiment of the present disclosure, a master base station (e.g., master base station 104A) in a cloud cell (e.g., the cloud cell 102A) assigns a single logical address to a mobile station (e.g., the mobile station 106A) for communication with a plurality of base stations (e.g., the base stations 104A-C) in the cloud cell 102A. In embodiments of the present disclosure, each of the base stations 104A-J in the geographical area 101 is allocated a disjoint set of addresses derived from a common address space for the base stations 104A-J in the geographical area 101. In these various embodiments, the master base station 104A assigns the single logical address from the associated disjoint set of addresses. The common address space is recognized by all base stations 102A-J located in the geographical area 101. However, a base station can assign a logical address to a mobile station from an associated set of addresses which is a subset of the common address space. Operations of assigning a logical address to a mobile station in a cloud cell will be described in the description that follows.

Figure 2:
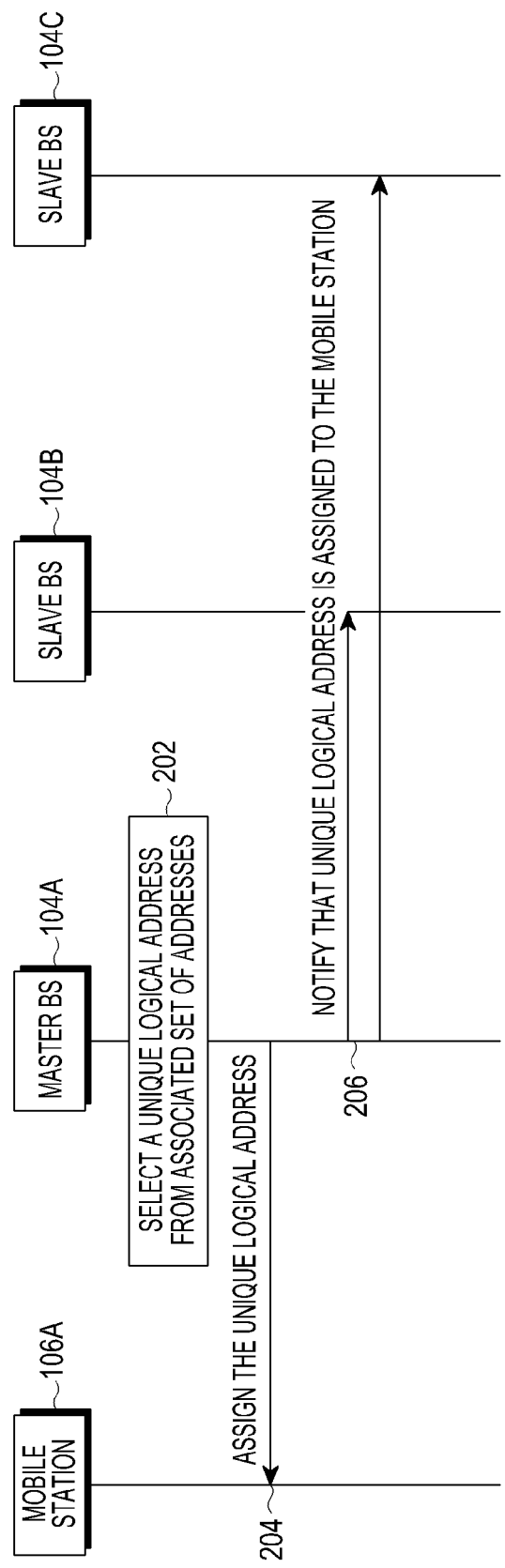
FIG. 2 is a process flow diagram illustrating a method for assigning a logical address to a mobile station in a cloud cell in a geographical area according to an embodiment of the present disclosure.

FIG. 2 is a process flow diagram illustrating a method for assigning a logical address to a mobile station in a cloud cell according to an embodiment of the present disclosure.

Referring FIG. 2, when a cloud cell 102A is formed, a master BS 104A needs to assign a unique logical identifier to a mobile station 106A in the cloud cell 102A so that the base stations 104A-C and the mobile station 106A in the cloud cell 102A communicates with each other using the unique logical address. The following operations describe a manner in which logical address is assigned to the mobile station 106A by the master base station 104A.

At operation 202, the master base station 104A selects a unique logical address from an associated set of addresses. According to the present disclosure, each base station in the geographical area 101 is assigned a disjoint set of addresses from a common address space. The set of addresses assigned to each base station is a subset of the common address space. Each base station is allowed to select a unique logical address exclusively from the associated disjoint set of addresses for assigning to a mobile station belonging to a respective cloud cell. However, it can be noted that, each base station can recognize other logical addresses in the common addresses which are not present in the associated set of addresses but cannot assign to the mobile station in the respective cloud cell.

Figure 13:
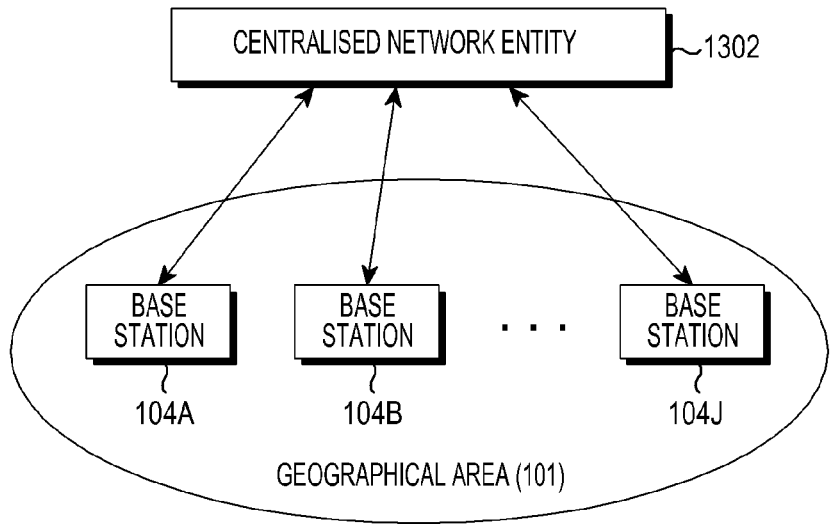
FIG. 13 is a block diagram illustrating a wireless network system for allocating disjoint sets of addresses to a plurality of base stations in a geographical area according to an embodiment of the present disclosure.

For the purpose of illustration, consider that the maximum number of base stations allowed in a cloud cell is M and N is the number of geographically adjacent base stations which are to be allocated different set of addresses, where adjacency can be defined in terms of geographical proximity and where N>M. In addition, consider that each base station in the geographical area 101 is assigned a unique Base Station Identifier (BSID) by a centralized network entity (not shown) of a wireless network system (e.g., as shown in FIG. 13). According to the present disclosure, the centralized entity derives multiple sets of addresses from a common address space using a BSID and a value N and allocates the multiple sets of addresses to the geographically adjacent base stations.

Figure 16A:
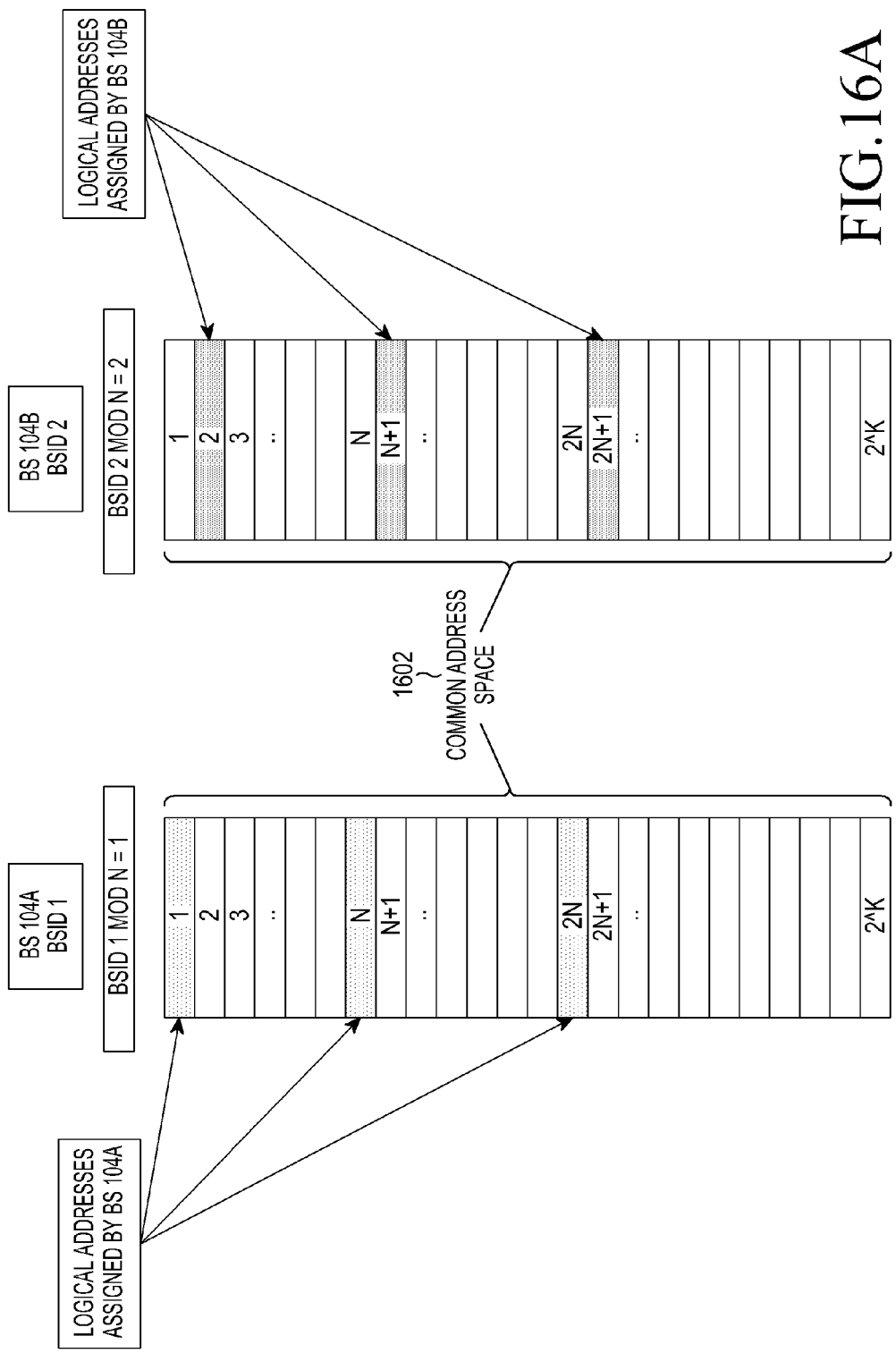
FIG. 16A is a schematic representation illustrating an allocation of a set of addresses to geographically adjacent base stations according to an embodiment of the present disclosure.

In one embodiment of the present disclosure, the centralized entity allocates set of addresses to base station with "BSIDs" such that logical addresses in the set of addresses satisfy the equality "Address"?modulo "N"="BSIDx" modulo "N" as illustrated in FIG. 16A.

In this embodiment of the present disclosure, the centralized entity may assign a unique BSID to each of the geographically adjacent base stations such that M number of the adjacent base stations has a distinct value of "BSID" modulo "N".

In an alternate embodiment of the present disclosure, consider that $N=2^n$ and BSID is of size m bits, where m>n. In addition, consider that the common address space is of size k bits. In such case, the centralized entity allocates a disjoint set of addresses to each of the geographically adjacent base stations such that the set of addresses contains $2^{(k-n)}$ logical addresses, as illustrated in FIG. 16B.

In embodiments of the present disclosure, the centralized entity allocates a group of consecutive $2^{(k-n)}$ logical addresses from the common address space as a set of addresses such that the first address is (BSID modulo N)*$2^{(k-n)}$. In these various embodiments, the centralized entity assigns BSIDs to each of the geographical adjacent base stations such that M number of adjacent base stations has a distinct value of "BSID" modulo "N".

Upon selection of the unique logical address, at operation 204, the master base station 104A assigns the unique logical address to the mobile station 106A so that the mobile station 106A and each of the base stations 104A-C communicate in the cloud cell 102A using the assigned unique logical address. At operation 206, the master base station 104A notifies assignment of the unique logical address to the mobile station 106A to the slave base stations 104B and 104C in the cloud cell 102A.

Figure 3:
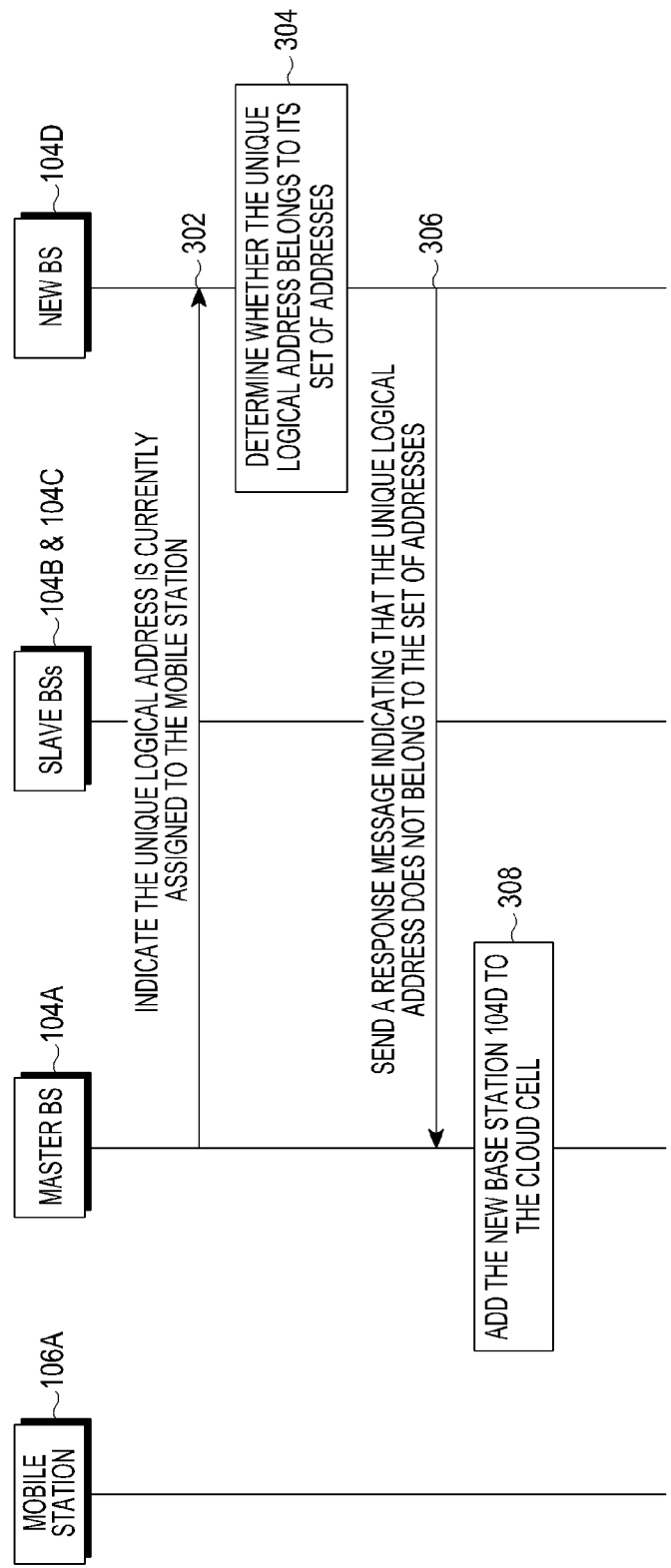
FIG. 3 is a flow diagram illustrating a method for managing conflict in an assigned logical address when a new base station is being added to a cloud cell according to an embodiment of the present disclosure.

FIG. 3 is a flow diagram illustrating a method for managing conflict in an assigned logical address when a new base station is being added to a cloud cell according to an embodiment of the present disclosure.

Referring to FIG. 3, when a new base station 104D is being added to the cloud cell 102A, the master base station 104A indicates the unique logical address currently assigned to the mobile station 106A to the base station 104D prior to adding the base station 104D to the cloud cell 102A, at operation 302. At operation 304, the base station 104D determines whether the currently assigned logical address belongs to an associated set of addresses. If the currently assigned logical address does not belong to the associated set of addresses, at operation 306, the base station 104D transmits a response message indicating that the currently assigned logical address does not belong to the set of addresses allocated to the base station 104D. At operation 308, the master base station 104A adds the base station 104D to the cloud cell 102A. Accordingly, the base station 104D uses the currently assigned logical address to the mobile station 106A for communication with the mobile station 106A.

Figure 4:
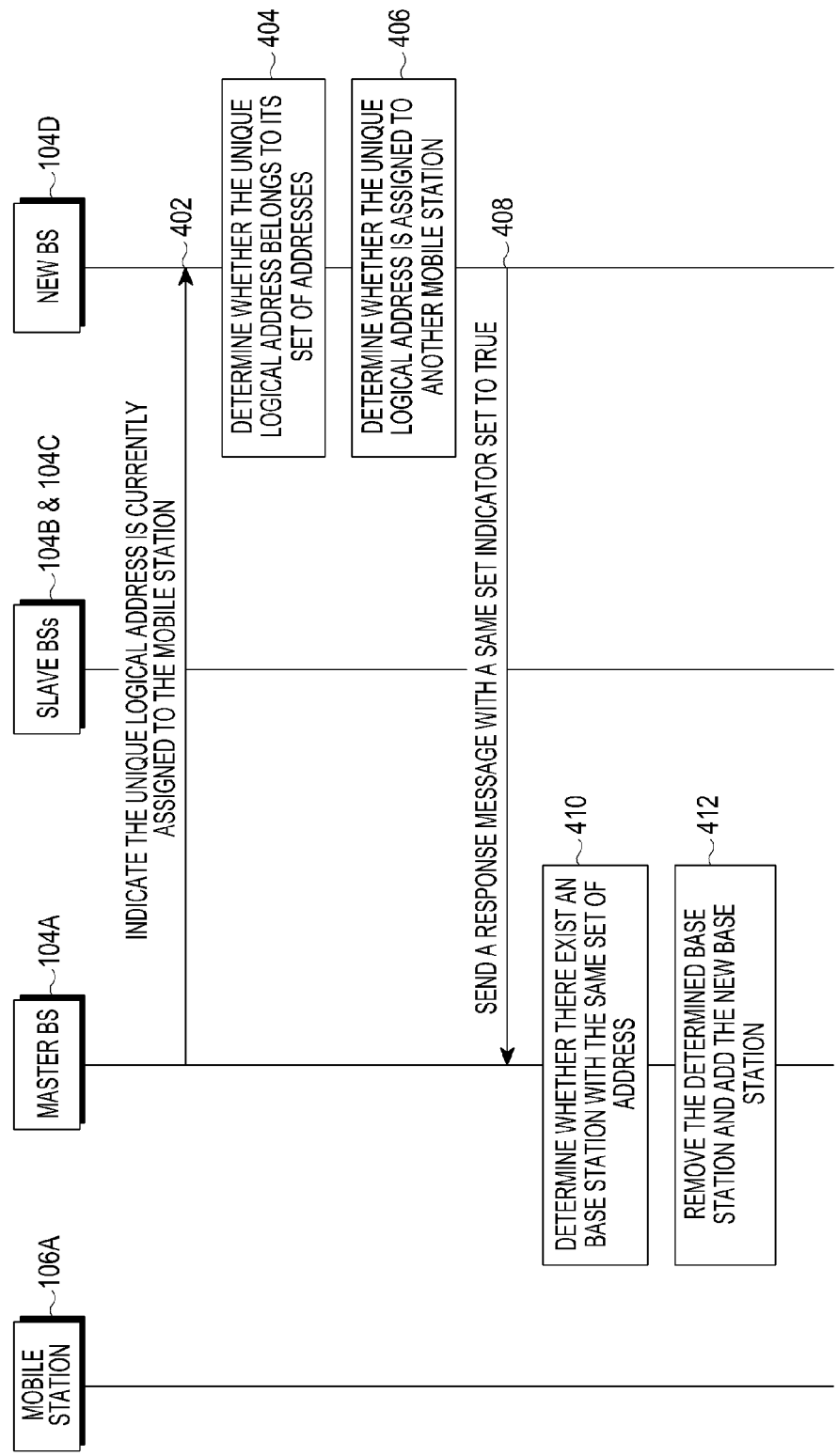
FIG. 4 is a flow diagram illustrating a method for managing conflict in an assigned logical address when a new base station is being added to a cloud cell according to an embodiment of the present disclosure.

FIG. 4 is a flow diagram illustrating a method for managing conflict in an assigned logical address when a new base station is being added to a cloud cell according to an embodiment of the present disclosure.

Referring to FIG. 4, at operation 402, the master base station 104A indicates the unique logical address currently assigned to the mobile station 106A to the base station 104D prior to adding the base station 104D to the cloud cell 102A. At operation 404, the base station 104D determines whether the currently assigned logical address belongs to the allocated set of addresses. If the logical address belongs to the allocated set of addresses, then at operation 406, the base station 104D determines whether the logical address that belongs to the allocated set of addresses is assigned to another mobile station. If the logical address belongs to the allocated set of addresses and is not assigned to another mobile station, then at operation 408, the base station 104D transmits a response message with a same set indicator set to TRUE to the master base station 104A. For example, the same set indicator in the response message may indicate that the currently assigned logical address belongs to the allocated set of addresses and whether assigned to another mobile station or not. The same set indicator set to 'TRUE' indicates that the currently assigned logical address belongs to the allocated set of addresses and is not assigned to another mobile station.

Upon receiving the response message, at operation 410, the master base station 104A determines whether a base station exists in the cloud cell 102A whose associated set of addresses are same as the base station 104D. Alternatively, upon receiving the response message, the master base station 104A may decide not to add the base station 104D to the cloud cell 102A. If there exists such base station in the cloud cell 102A, then at operation 412, the master base station 104A removes such base station (e.g., any of the base stations 104B and C) having the same set of addresses as the base station 104D and adds the base station 104D to the cloud cell 102A. Alternatively, at operation 412, the master base station 104A may decide not to add the base station 104D to the cloud cell 102A if there exists such base station in the cloud cell 102A. In addition, it may be possible that, the master base station 104A may add the base station 104D to the cloud cell 102A without removing the base station which has the same set of addresses as the base station 104D.

Figure 5:
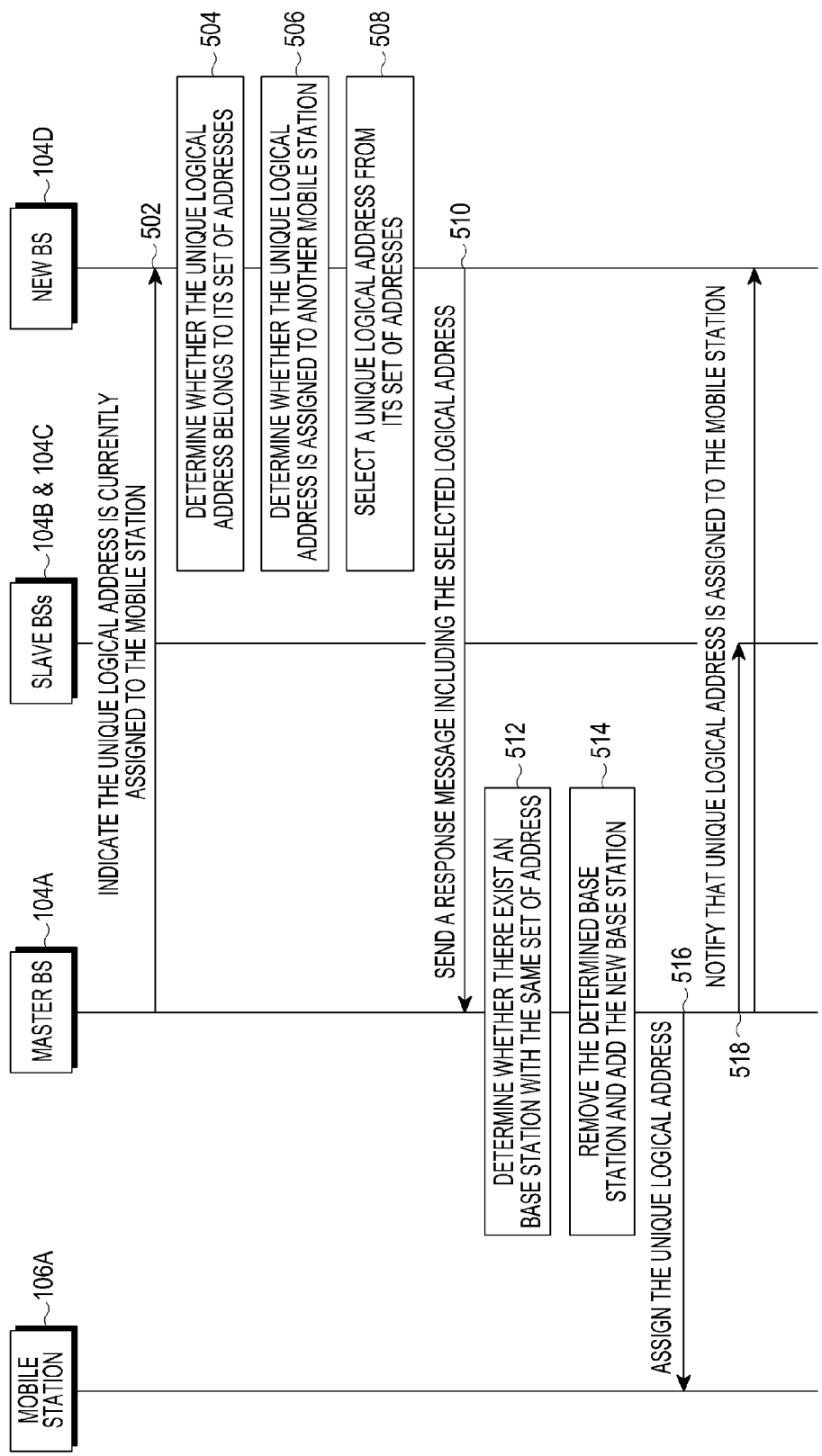
FIG. 5 is a flow diagram illustrating a method for managing conflict in an assigned logical address when a new base station is being added to a cloud cell according to an embodiment of the present disclosure.

FIG. 5 is a flow diagram illustrating a method for managing conflict in an assigned logical address when a new base station is being added to a cloud cell according to an embodiment of the present disclosure.

Referring to FIG. 5, it is appreciated the operations 502 to 506 are the same as operations 402 to 406 of FIG. 4. If, at operation 506, the base station 104D determines that the logical address belongs to the allocated set of addresses and is assigned to another mobile station, then at operation 508, the base station 104D selects a unique logical address from the associated set of addresses. At operation 510, the base station 104D transmits a response message including the unique logical address to the master base station 104A and indicating that the currently assigned logical address belongs to the allocated set of addresses and is assigned to another mobile station.

Upon receiving the response message, at operation 512, the master base station 104A determines whether a base station exists in the cloud cell 102A whose associated set of addresses are same as the base station 104D. If it is determined that no base station having the same set of addresses exists, the master base station 104A may directly add the base station 104D to the cloud cell 102A and proceeds to operation 516. If there exists such base station in the cloud cell 102A, then at operation 514, the master base station 104A removes such base station (e.g., any of the base stations 104B and C) having the same set of addresses as the base station 104D and adds the base station 104D to the cloud cell 102A.

At operation 516, the master base station 104A re-assigns the unique logical address received in the response message to the mobile station 106A so that the mobile station 106A and each of the base stations communicate in the cloud cell 102A using the re-assigned unique logical address. At operation 518, the master base station 104A notifies re-assignment of the unique logical address to the mobile station 106A to the slave base stations in the cloud cell 102A. Alternatively, at operation 514, the master base station 104A may decide not to add the base station 104D to the cloud cell 102A if there exists such base station in the cloud cell 102A. In such case, the master base station 104A may not re-assign the unique logical address.

Alternatively, upon receiving the response message, the master base station 104A may reject the inclusion of the base station 104D to the cloud cell 102A.

Figure 6:
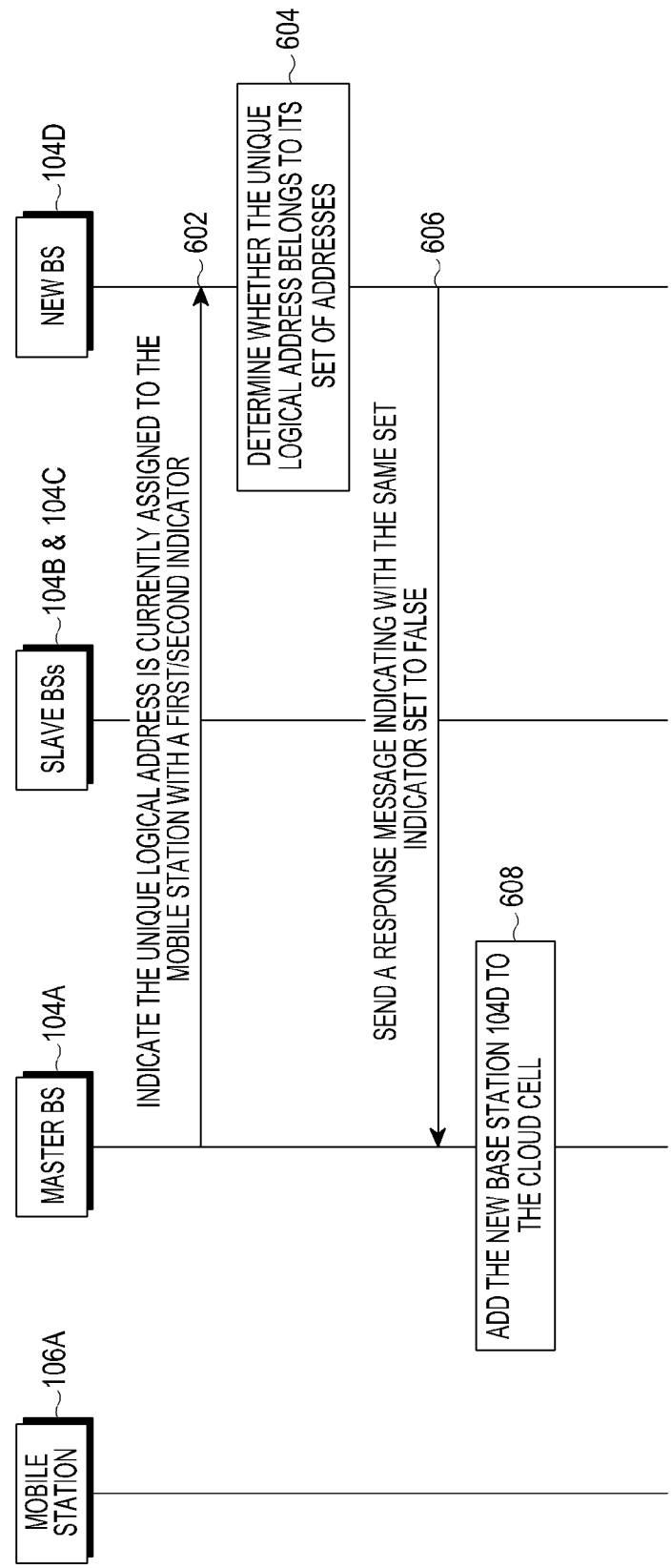
FIG. 6 is a flow diagram illustrating a method for managing conflict in an assigned logical address when a new base station is being added to a cloud cell according to an embodiment of the present disclosure.

FIG. 6 is a flow diagram illustrating a method for managing conflict in an assigned logical address when a new base station is being added to a cloud cell according to an embodiment of the present disclosure.

Referring to FIG. 6, when a new base station 104D is being added to the cloud cell 102A, the master base station 104A indicates the unique logical address currently assigned to the mobile station 106A along with one of a first indicator and a second indicator to the base station 104D, at operation 602. For example, the first indicator indicates that one or more base stations in the cloud cell 102A has a same set of addresses as the set of addresses from which the unique logical address is currently assigned to the mobile station 106A. The second indicator indicates that all the base stations in the cloud cell 102A has same set of addresses as the set of addresses from which the unique logical address is currently assigned to the mobile station 106A. Any one of the first indicator and the second indicator is communicated to the base station 104D along with the currently assigned unique logical address. The master base station 104A may not transmit the first indicator, if the value of the second indicator is 'TRUE'(i.e., all the base stations has same set of addresses). On the other hand, the master base station 104A may transmit the first indicator if the value of the second indicator is 'FALSE'(i.e., not all but at least two of the base stations in the cloud cell 102A has same set of addresses). This is possible as the master base station 104A maintains a list of base stations along with their set of addresses.

At operation 604, the base station 104D determines whether the currently assigned logical address belongs to the associated set of addresses. If the currently assigned logical address does not belong to the associated set of addresses, at operation 606, the base station 104D transmits a response message including a same set indicator set to FALSE to the base station 104D. The same set indicator set to FALSE indicates that the currently assigned logical address does not belong to the set of addresses allocated to the base station 104D. At operation 608, the master base station 104A adds the base station 104D to the cloud cell 102A.

Figure 7:
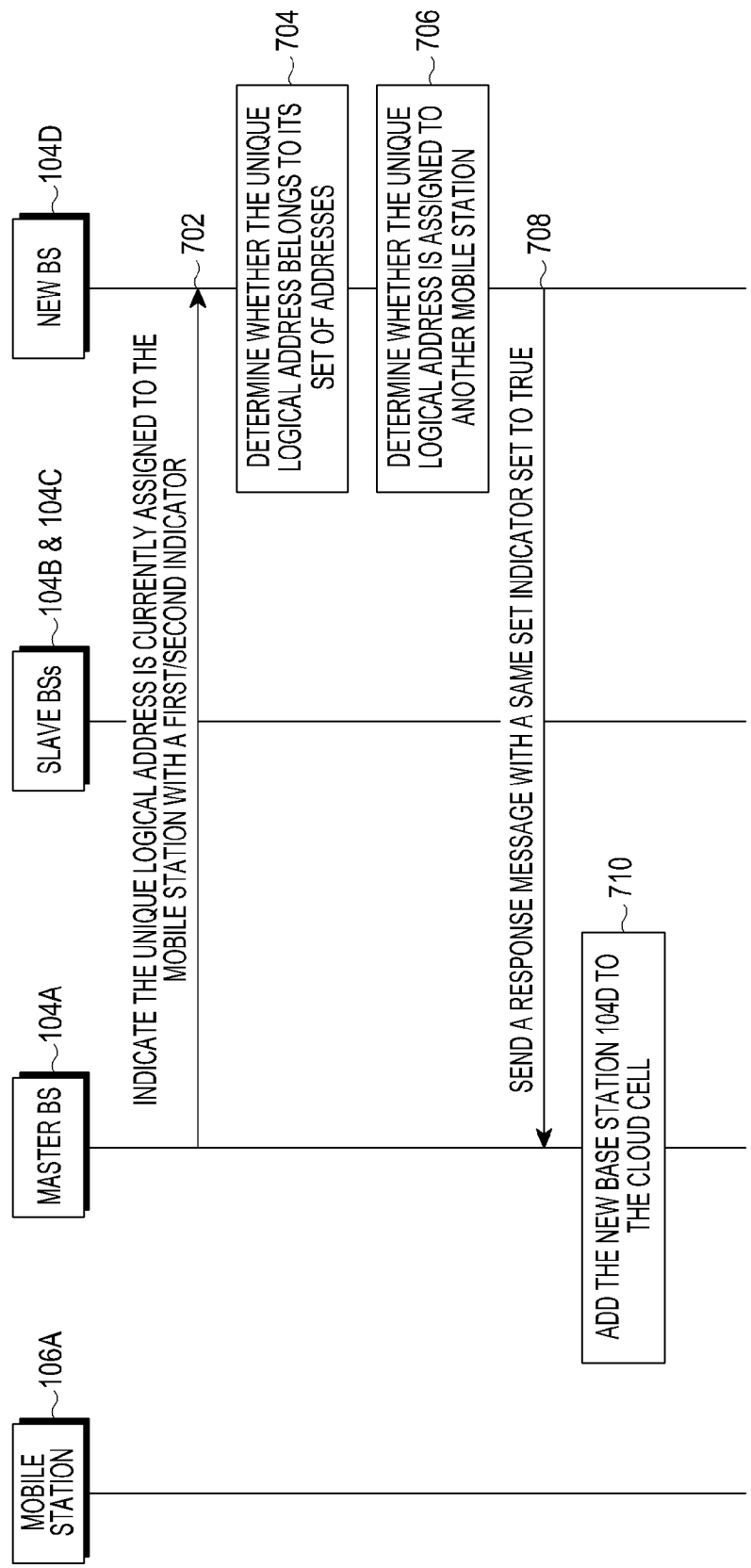
FIG. 7 is a flow diagram illustrating a method for managing conflict in an assigned logical address when a new base station is being added to a cloud cell according to an embodiment of the present disclosure.

FIG. 7 is a flow diagram illustrating a method for managing conflict in an assigned logical address when a new base station is being added to a cloud cell according to an embodiment of the present disclosure.

Referring to FIG. 7, at operation 702, the master base station 104A indicates the unique logical address currently assigned to the mobile station 106A along with at least one of a first indicator and a second indicator to the base station 104D prior to adding the base station 104D to the cloud cell 102A. At operation 704, the base station 104D determines whether the currently assigned logical address belongs to the allocated set of addresses.

If the logical address belongs to the allocated set of addresses, then at operation 706, the base station 104D determines whether the logical address that belongs to the allocated set of addresses is assigned to another mobile station. If the logical address belongs to the allocated set of addresses and is not assigned to another mobile station, then at operation 708, the base station 104D transmits a response message with a same set indicator set to 'TRUE' to the master base station 104A. For example, the same indicator in the response message may indicate that the currently assigned logical address belongs to the allocated set of addresses and whether assigned to another mobile station or not. The same set indicator set to 'TRUE' indicates that the currently assigned logical address belongs to the allocated set of addresses and is not assigned to another mobile station. Accordingly, at operation 710, the master base station 104A adds the base station 104D to the cloud cell 102A and updates the list of base stations which has the same set of addresses.

Figure 8:
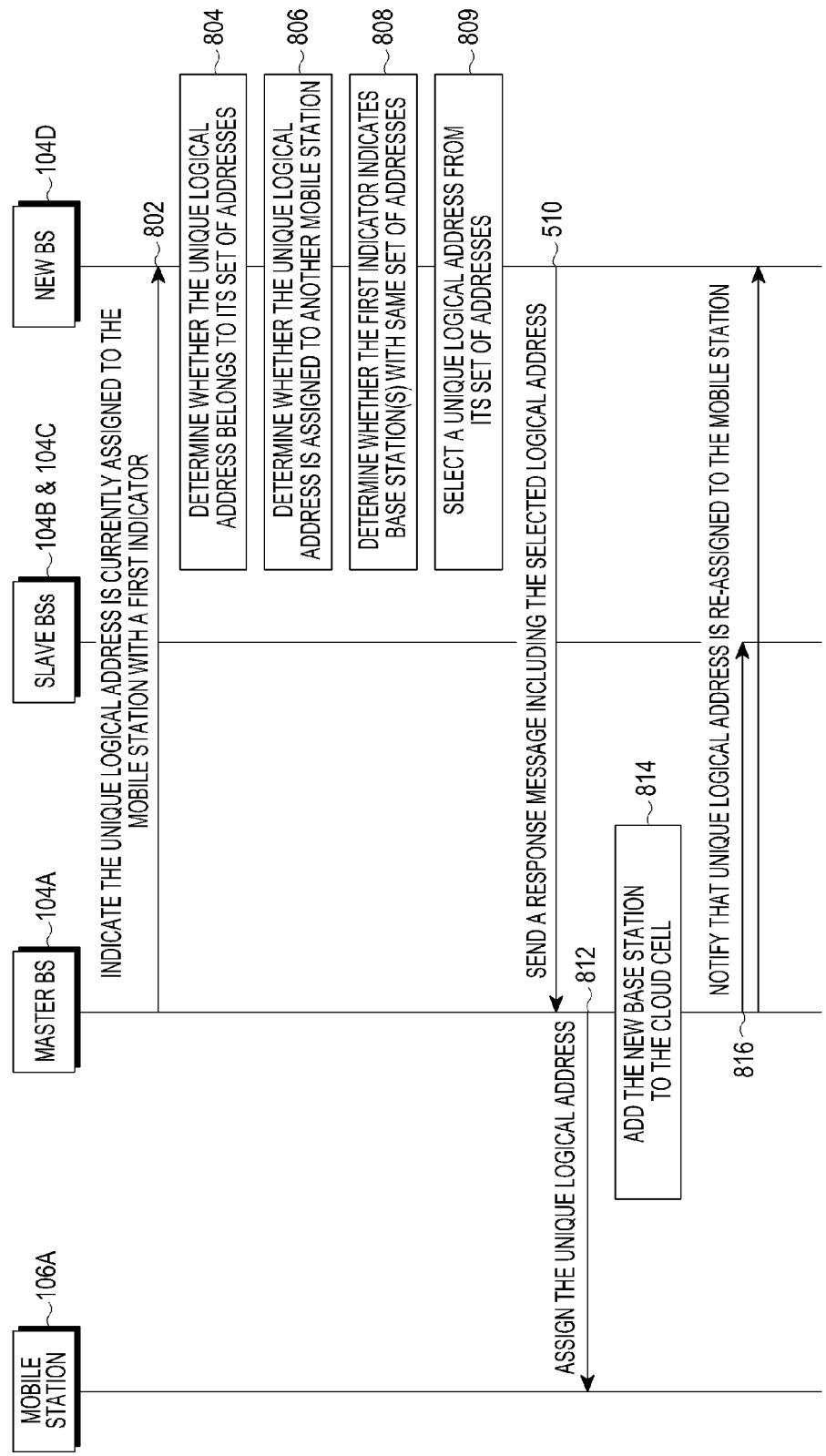
FIG. 8 is a flow diagram illustrating a method for managing conflict in an assigned logical address when a new base station is being added to a cloud cell according to an embodiment.

FIG. 8 is a flow diagram illustrating a method for managing conflict in an assigned logical address when a new base station is being added to a cloud cell according to an embodiment of the present disclosure.

Referring to FIG. 8, it is appreciated that the operations 802 to 806 are same as the operations 702 to 706 of FIG. 7. If, at operation 806, the base station 104D determines that the logical address belongs to the allocated set of addresses and is assigned to another mobile station, then at operation 808, the base station 104D determines whether the first indicator indicates whether any base station in the cloud cell 102A has the same set of addresses from which the logical address is currently assigned to the mobile station 106A.

At operation 809, the base station 104D selects a unique logical address from the allocated set of addresses such that the selected logical address is different from the currently assigned logical address if the first indicator indicates that none of the base stations in the cloud cell 102A are allocated the same set of addresses from which the logical address is currently assigned to the mobile station 106A. At operation 810, the base station 104D transmits a response message including the unique logical address to the master base station 104A.

Upon receiving the response message, at operation 812, the master base station 104A re-assigns the unique logical address received in the response message to the mobile station 106A. At operation 814, the master base station 104A adds the base station 104D to the cloud cell 102A and updates the list of base stations which has the same set of addresses. At operation 816, the master base station 104A notifies assignment of the unique logical address to the mobile station 106A to the slave base stations 104A-D in the cloud cell 102A.

Figure 9:
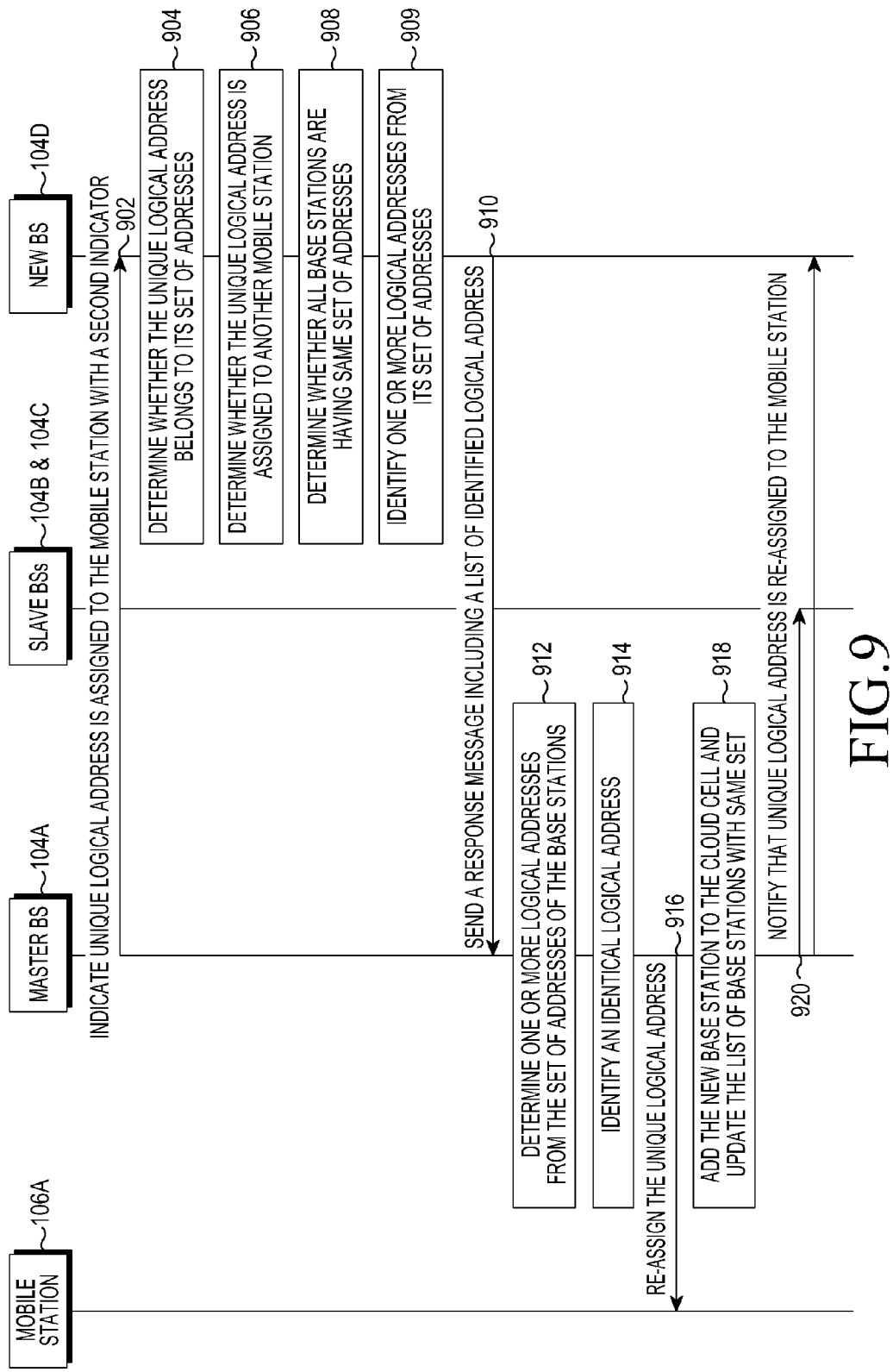
FIG. 9 is a flow diagram illustrating a method for managing conflict in an assigned logical address when a new base station is being added to a cloud cell according to an embodiment of the present disclosure.

FIG. 9 is a flow diagram illustrating a method for managing conflict in an assigned logical address when a new base station is being added to a cloud cell according to an embodiment of the present disclosure.

Referring to FIG. 9, it is appreciated that the operations 902 to 906 are same as the operations 702 to 706 of FIG. 7. If, at operation 906, the base station 104D determines that the logical address belongs to the allocated set of addresses and is assigned to another mobile station, then at operation 908, the base station 104D determines whether the second indicator indicates whether all the base station in the cloud cell 102A has the same set of addresses from which the logical address is currently assigned to the mobile station 106A.

At operation 909, the base station 104D identifies one or more unassigned logical addresses in the allocated set of addresses if the second indicator indicates that all the base stations in the cloud cell 102A are allocated the same set of addresses from which the logical address is currently assigned to the mobile station 106A. At operation 910, the base station 104D transmits a response message including the list of identified logical addresses to the master base station 104A.

Upon receiving the response message, at operation 912, the master base station 104A determines one or more unassigned logical addresses from the set of addresses of the base stations 104A-C in the cloud cell 102. At operation 914, the master base station 104A identifies an identical logical address from the list of unassigned logical address and the one or more unassigned logical addresses. At operation 916, the master base station 104A re-assigns the identical logical address to the mobile station 106A. At operation 918, the master base station 104A adds the base station 104D to the cloud cell 102A and updates the list of base stations which has the same set of addresses. At operation 920, the master base station 104A notifies assignment of the identical logical address to the mobile station 106A to the slave base stations 104A-D in the cloud cell 102A.

Figure 10:
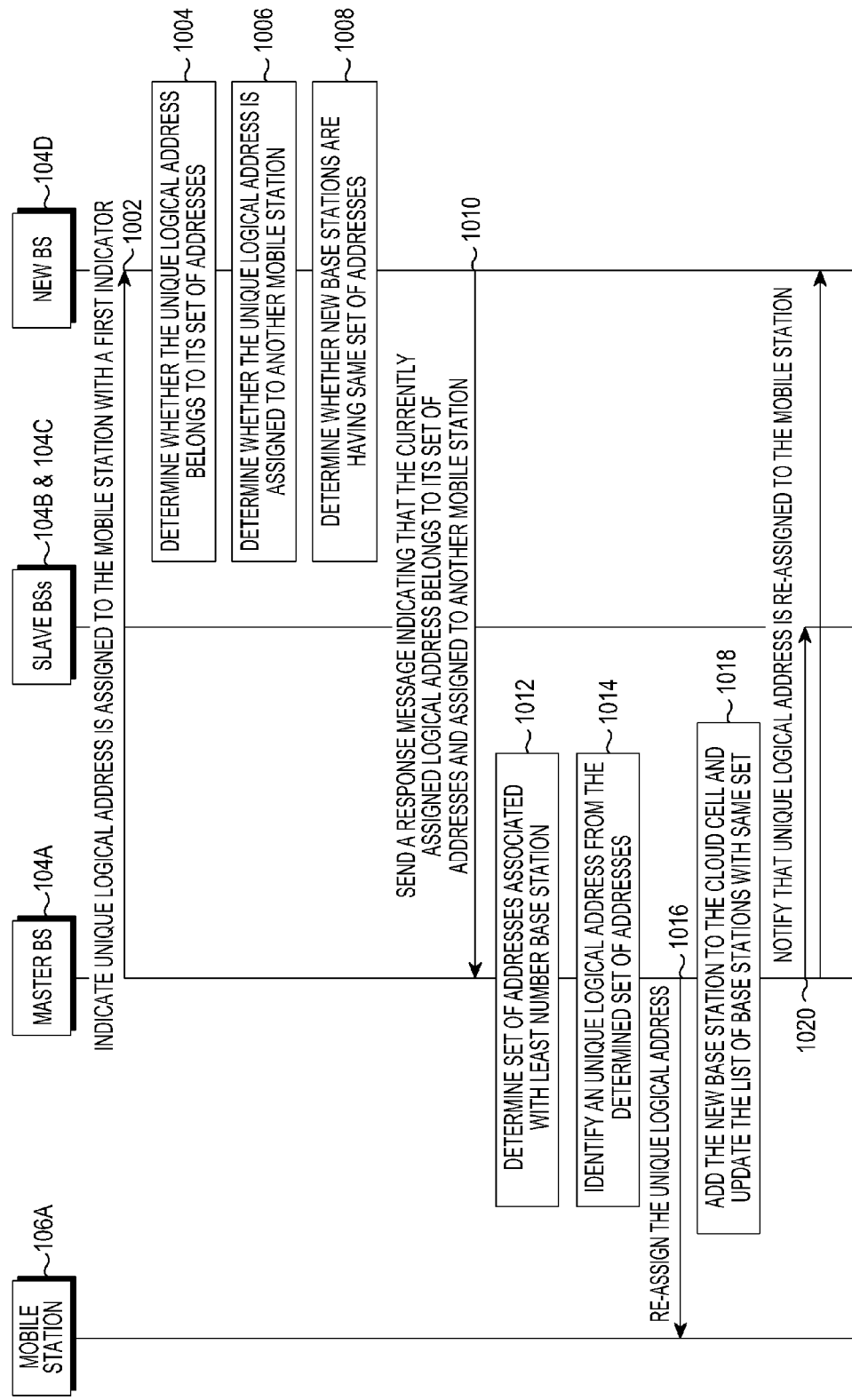
FIG. 10 is a flow diagram illustrating a method for managing conflict in an assigned logical address when a new base station is being added to a cloud cell according to an embodiment of the present disclosure.

FIG. 10 is a flow diagram illustrating a method for managing conflict in an assigned logical address when a new base station is being added to a cloud cell according to an embodiment of the present disclosure.

Referring to FIG. 10, it is appreciated that the operations 1002 to 1006 are same as the operations 702 to 706 of FIG. 7. If, at operation 1006, the base station 104D determines that the logical address belongs to the allocated set of addresses and is assigned to another mobile station, then at operation 1008 is performed. At operation 1008, the base station 104D determines whether the first indicator indicates whether few base stations in the cloud cell 102A has the same set of addresses from which the logical address is currently assigned to the mobile station 106A. At operation 1010, the base station 104D transmits a response message indicating that the currently assigned logical address belongs to the allocated set of addresses and is assigned to another mobile station if the first indicator indicates that not all but few base stations in the cloud cell 102A are allocated the same set of addresses to which the currently assigned logical address belongs to.

Upon receiving the response message, at operation 1010, the master base station 104A adds the base station 104D to the cloud cell 102A and updates the list of base stations which has the same set of addresses. At operation 1012, the master base station 104A determines a set of addresses which is allocated to the least number of base stations in the cloud cell 102A from the sets of addresses allocated to the respective base stations 104A-D in the cloud cell 102A. In embodiments of the present disclosure, the master base station 104A maintains a categorized list of base stations and associated set of addresses, as shown in FIG. 12.

Figures 11, 12:
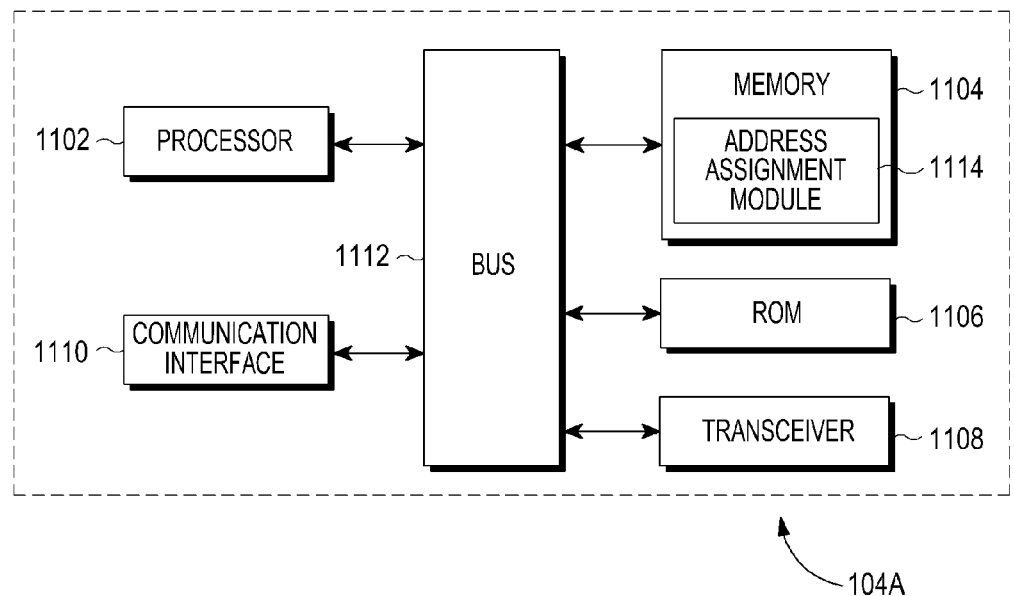
FIG. 11 illustrates a block diagram of a base station showing various components for implementing embodiments of the present subject matter according to an embodiment of the present disclosure.
FIG. 12 is a tabular representation illustrating a categorized list of base stations and associated set of addresses as maintained by the master base station according to an embodiment of the present disclosure.

FIG. 12 is a tabular representation illustrating a categorized list of base stations and associated set of addresses as maintained by the master base station according to an embodiment of the present disclosure.

Referring to FIG. 12, the master base station 104A updates the list of base stations and associated set of addresses when any of the base stations is removed or added from/to the cloud cell 102A. For example, when a base station(s) is added to the cloud cell 102A, the base station indicates associated set of addresses to the master base station 104A. At operation 1014, the master base station 104A selects a unique logical address from the determined set of addresses. At operation 1016, the master base station 104A re-assigns the unique logical address to the mobile station 106A. At operation 1018, the master base station 104A adds the new base station to the cloud cell and updates the list of base stations with the same set. At operation 1020, the master base station 104A notifies re-assignment of the unique logical address to the mobile station 106A to the slave base stations 104A-D in the cloud cell 102A.

FIG. 11 illustrates a block diagram of a base station showing various components for implementing embodiments of the present subject matter according to an embodiment of the present disclosure.

Referring to FIG. 11, the base station 104A includes a processor 1102, memory 1104, a Read Only Memory (ROM) 1106, a transceiver 1108, a communication interface 1110, and a bus 1112.

The processor 1102, as used herein, refers to any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 1102 may also include embedded controllers, such as generic or programmable logic devices or arrays, application specific integrated circuits, single-chip computers, smart cards, and the like.

The memory 1104 may be a volatile memory and a non-volatile memory. The memory 1104 may include an address assignment module 1114 for assigning a unique logical address from disjoint set of addresses in a common address space to the mobile station 106A in the cloud cell 102A, according to the various embodiments illustrated in FIGS. 1 to 10. A variety of computer-readable storage media may be stored in and accessed from the memory elements. Memory elements may include any suitable memory device(s) for storing data and machine-readable instructions, such as a read only memory, a random access memory, an erasable programmable read only memory, an electrically erasable programmable read only memory, a hard drive, a removable media drive for handling memory cards, Memory Sticks™, and the like.

Various embodiments of the present subject matter may be implemented in conjunction with modules including functions, procedures, data structures, and application programs, for performing tasks, defining abstract data types, or low-level hardware contexts. The address assignment module 1114 may be stored in the form of machine-readable instructions on any of the above-mentioned storage media and is executable by the processor 1102. For example, a computer program may include the machine-readable instructions capable of assigning a unique logical address from disjoint set of addresses in a common address space to the mobile station 106A in the cloud cell 102A, according to the teachings and herein described various embodiments of the present subject matter. The computer program may be included on a non-transitory computer-readable storage medium and loaded from the storage medium to a hard drive in the non-volatile memory.

The components, such as the ROM 1106, the transceiver 1108, the communication interface 1110, the bus 1112, and the like, are well known to the person skilled in the art and hence the explanation is thereof omitted.

FIG. 13 is a block diagram illustrating a wireless network system for allocating disjoint sets of addresses to a plurality of base stations in a geographical area according to an embodiment of the present disclosure.

Referring to FIG. 13, the wireless network system includes a centralized network entity 1302 and a plurality of base stations 104A-J located adjacent to each other in the geographical area 101. In an embodiment, the base stations 104A-J may be part of the cloud cells 102A-C as shown in FIG. 1.

According to the present disclosure, the centralized network entity 1302 is configured to derive disjoint sets of addresses from a common address space and allocating the disjoint sets of addresses to the plurality of base stations 104A-J in the geographical area 101 as described below.

Figure 14:
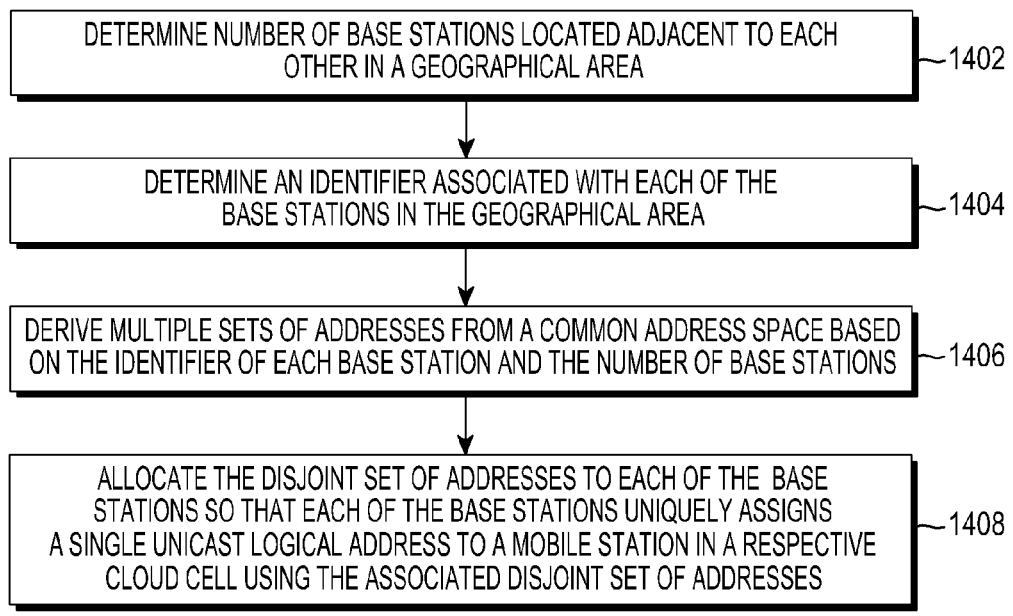
FIG. 14 is a flowchart illustrating a method for allocating disjoint sets of addresses to a plurality of base stations in a geographical area according to an embodiment of the present disclosure.

FIG. 14 is a process flowchart illustrating a method for allocating disjoint sets of addresses to a plurality of base stations in a geographical area according to an embodiment of the present disclosure.

Referring to FIG. 14, at operation 1402, a number of base stations located adjacent to each other in a geographical area are determined. At operation 1404, an identifier associated with each of the base stations in the geographical area is determined.

At operation 1406, multiple sets of addresses are derived from a common address space based on the identifier of each base station (BSID) and the number of base stations (N) such that each of the sets of addresses are subset of the common address space. At operation 1408, disjoint sets of addresses are allocated to each of the plurality of base stations in the geographical area 101.

FIG. 16A is a schematic representation illustrating an allocation of a set of addresses to geographically adjacent base stations according to an embodiment of the present disclosure.

Referring to FIG. 16A, the disjoint sets of addresses derived from a common address space 1602 such that each of the disjoint sets of addresses contains logical addresses which satisfy the equality "Address" modulo "number of base stations"="Base Station Identifier" modulo "number of base stations".

FIG. 16B is a schematic representation illustrating an allocation of a set of addresses to geographically adjacent base stations according to an embodiment of the present disclosure.

Referring to FIG. 16B, the multiple sets of addresses are derived from the common address space 1602 such that each of the multiple sets of addresses contains $2^{(k-n)}$ logical addresses, where 'k' is size of the common address space and 'n' is an integer. The value of 'n' can be calculated based on the number of base stations which is equal to 2'. In one embodiment, a group of consecutive $2^{(k-n)}$ logical addresses are derived from the common address space 1602 as a set of addresses such that the first logical address is (BSID modulo N)*$2^{(k-n)}$).

Figure 15:
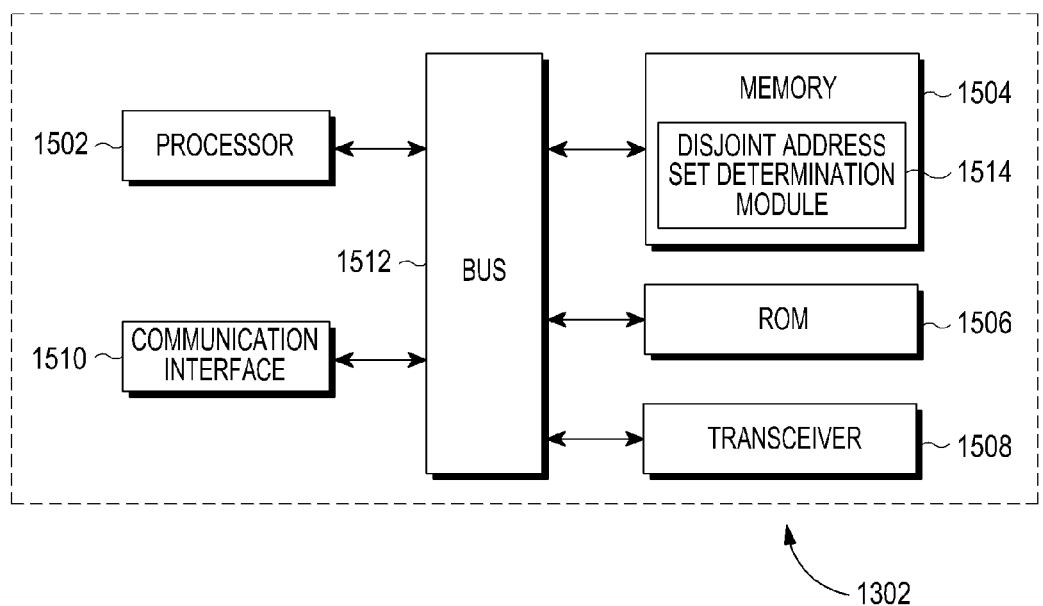
FIG. 15 illustrates a block diagram of a centralized entity showing various components for implementing embodiments of the present subject matter according to an embodiment of the present disclosure.

FIG. 15 illustrates a block diagram of a centralized entity showing various components for implementing embodiments of the present subject matter according to an embodiment of the present disclosure.

Referring to FIG. 15, the centralized entity 1302 includes a processor 1502, memory 1504, a ROM 1506, a transceiver 1508, a communication interface 1510, and a bus 1512.

The processor 1502, as used herein, refers to any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 1502 may also include embedded controllers, such as generic or programmable logic devices or arrays, application specific integrated circuits, single-chip computers, smart cards, and the like.

The memory 1504 may be a volatile memory and a non-volatile memory. The memory 1504 may include a disjoint address set determination module 1514 for deriving disjoint sets of addresses from a common address space and allocating the disjoint sets of addresses to the plurality of base stations 104A-J in the geographical area 101, according to the various embodiments illustrated in FIGS. 13 and 14. A variety of computer-readable storage media may be stored in and accessed from the memory elements. Memory elements may include any suitable memory device(s) for storing data and machine-readable instructions, such as a read only memory, a random access memory, an erasable programmable read only memory, an electrically erasable programmable read only memory, a hard drive, a removable media drive for handling memory cards, Memory Sticks™, and the like.

Various embodiments of the present subject matter may be implemented in conjunction with modules including functions, procedures, data structures, and application programs, for performing tasks, defining abstract data types, or low-level hardware contexts. The disjoint address set determination module 1514 may be stored in the form of machine-readable instructions on any of the above-mentioned storage media and is executable by the processor 1502. For example, a computer program may include the machine-readable instructions capable of deriving disjoint sets of addresses from a common address space and allocating the disjoint sets of addresses to the plurality of base stations 104A-J in the geographical area 101, according to the teachings and herein described various embodiments of the present subject matter. The computer program may be included on a non-transitory computer-readable storage medium and loaded from the storage medium to a hard drive in the non-volatile memory.

The components, such as the ROM 1506, the transceiver 1508, the communication interface 1510, the bus 1512, and the like, are well known to the person skilled in the art and hence the explanation is thereof omitted.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. A method for assigning a logical address by a master base station to a mobile station in a cloud cell of a wireless communication system comprising the master base station and at least one slave base station serving the mobile station, the method comprising:

selecting, by the master base station, a unique logical address from a set of logical addresses associated with the master base station, the set of addresses being derived from a common address space comprising a plurality of logical addresses;

assigning, by the master base station, the unique logical address to the mobile station for communicating with the master base station and the at least one slave base station;

notifying, by the master base station, the at least one slave base station of the assignment of the unique logical address to the mobile station;

transmitting, by the master base station, the unique logical address assigned to the mobile station to a new base station being added to the cloud cell; and receiving, at the master base station, a notification associated with the unique logical address assigned to the mobile station from the new base station and adding the new base station to the cloud cell as a slave base station serving the mobile station based on the notification, wherein each of the master base station and the at least one slave base station is assigned a different set of logical addresses derived from the common address space, and wherein logical addresses included in the different set are determined based on the number of base stations located adjacent to each other in a predetermined area and identifiers of the base stations located adjacent to each other in the predetermined area.

2. The method of claim 1, further comprising:

determining, by the new base station, whether the unique logical address belongs to a set of addresses associated with the new base station;

determining whether the unique logical address is assigned to another mobile station belonging to another cloud cell if the unique logical address belongs to the set of addresses associated with the new base station; and transmitting the notification to the master base station indicating that the unique logical address does not belong to the set of addresses associated with the new base station.

3. The method of claim 2, further comprising:

transmitting, by the new base station, the notification to the master base station indicating that the unique logical address belongs to the set of addresses associated with the new base station and the unique logical address is not assigned to another mobile station.

4. The method of claim 3, further comprising:

determining, by the master base station, whether any base station exists in the cloud cell with the set of addresses identical to the set of addresses of the new base station upon receiving the notification; and removing the determined base station having the set of addresses identical to the set of addresses of the new base station.

5. The method of claim 3, further comprising:

determining, by the master base station, whether there exists any base station in the cloud cell having the set of addresses identical to the set of addresses of the new base station upon receiving the notification; and rejecting inclusion of the new base station in to the cloud cell if any base station in the cloud cell is having the set of addresses identical to the set of addresses of the new base station.

6. The method of claim 2, further comprising:

selecting, by the new base station, a unique logical address from the set of addresses associated with the new base station; and transmitting the notification indicating that the unique logical address belongs to the set of addresses associated with the new base station and the unique logical address is assigned to the another mobile station to the master base station, wherein the notification includes the unique logical address selected from the set of addresses associated with the new base station.

7. The method of claim 6, further comprising:

determining, by the master base station, whether any base station exists in the cloud cell having the set of addresses identical to the set of addresses of the new base station upon receiving the notification; and removing the determined base station having the set of addresses identical to the set of addresses of the new base station.

8. The method of claim 7, further comprising:

re-assigning, by the master base station, the unique logical address received in the notification to the mobile station; and notifying assignment of the unique logical address to the slave base stations in the cloud cell.

9. The method of claim 6, further comprising:

determining, by the master base station, whether any base station exists in the cloud cell having the set of addresses identical to the set of addresses of the new base station upon receiving the notification; and rejecting inclusion of the new base station to the cloud cell if any base station in the cloud cell is having the set of addresses identical to the set of addresses of the new base station.

10. The method of claim 8, wherein the transmitting of the unique logical address currently assigned to the mobile station to the new base station comprises:

transmitting, to the new base station, the unique logical address currently assigned to the mobile station and at least one of a first indicator indicating whether one or more base stations in the cloud cell are having same set of addresses from which the unique logical address is currently assigned to the mobile station or a second indicator indicating whether all the base stations in the cloud cell are having the same set of addresses from which the unique logical address is currently assigned to the mobile station.

11. The method of claim 10, wherein the selecting of the unique logical address from the set of addresses associated with the new base station comprises:

determining whether one or more of the base stations in the cloud cell has the set of addresses identical to the set of addresses associated with the new base station based on the least one of the first indicator and the second indicator if the unique logical address is assigned to another mobile station;

selecting a unique logical address from the set of addresses associated with the new base station if none of the base stations in the cloud cell has identical set of addresses as the new base station; and identifying one or more unassigned logical addresses selected from the set of addresses associated with the new base station if all the base stations in the cloud cell has identical set of addresses as the new base station.

12. The method of claim 11, wherein the transmitting of the notification indicating that the unique logical address belongs to the set of addresses and the unique logical address is assigned to the another mobile station comprises:

transmitting the notification including the unique logical address selected from the set of addresses associated with the new base station.

13. The method of claim 12, wherein the transmitting of the notification indicating that the unique logical address belongs to the set of addresses and the unique logical address is assigned to the another mobile station comprises:

transmitting the notification including a list of the unassigned logical addresses identified from the set of addresses of the new base station.

14. The method of claim 11, wherein the transmitting of the notification indicating that the unique logical address belongs to the set of addresses and the unique logical address is assigned to the another mobile station comprises:

transmitting the notification to the master base station indicating that the unique logical address belongs to the set of addresses associated with the new base station and the unique logical address is assigned to another mobile station if the one or more of the base stations in the cloud cell has identical logical addresses as the new base station.

15. The method of claim 12, wherein the re-assigning of the unique logical address to the mobile station comprises:

re-assigning the unique logical address received in the notification to the mobile station.

16. The method of claim 13, wherein the re-assigning of the unique logical address to the mobile station comprises:

determining one or more unassigned logical addresses in the set of addresses associated with each of the base stations in the cloud cell upon receiving the notification;

determining an identical unique logical address from the determined one or more unassigned logical addresses and the list of unassigned logical addresses received from the new base station; and assigning the determined identical unique logical address to the mobile station.

17. The method of claim 14, wherein the re-assigning of the unique logical address to the mobile station comprises:

identifying a set of addresses which is associated with the least number of base stations in the cloud cell;

obtaining a unique logical address from the identified set of addresses; and assigning the unique logical address to the mobile station.

18. The method of claim 1, wherein the logical addresses included in the different set contain address values satisfying the following equation, address value modulo the number of base stations equals the identifier modulo the number of base stations.

19. The method of claim 1, wherein logical addresses included in the different set are further determined based on a size of the common address space.

20. A base station for assigning a logical address to a mobile station in a cloud cell of a wireless communication system comprising the base station and at least one slave base station serving the mobile station, the base station comprising:

a communication interface configured to communicate with the at least one slave base station;

a transceiver configured to communicate with the mobile station; and a processor configured to:

select a unique logical address from a set of logical addresses associated with the base station, the set of addresses being derived from a common address space comprising a plurality of addresses, assign the unique logical address to the mobile station for communicating with the base station and the at least one slave base station, notify the at least one slave base station of the assignment of the unique logical address to the mobile station, transmit the unique logical address assigned to the mobile station to a new base station being added to the cloud cell, and receive, at the base station, a notification associated with the unique logical address assigned to the mobile station from the new base station and adding the new base station to the cloud cell as a slave base station serving the mobile station based on the notification, wherein each of the base station and the at least one slave base station is assigned a different set of logical addresses derived from the common address space, and wherein logical addresses included in the different set are determined based on the number of base stations located adjacent to each other in a predetermined area and identifiers of the base stations located adjacent to each other in the predetermined area.

* * * * *